United States Patent [19]

Yong-sup

[11] Patent Number: 5,122,324
[45] Date of Patent: Jun. 16, 1992

[54] METHOD OF FORMING GOLF WOOD CLUB HEAD

[75] Inventor: Kim Yong-sup, Kyong-Nam, Rep. of Korea

[73] Assignee: Kingstone Golf Club Company, Ltd., Kyong-Nam, Rep. of Korea

[21] Appl. No.: 514,543

[22] Filed: Apr. 26, 1990

[30] Foreign Application Priority Data

Nov. 1, 1989 [KR] Rep. of Korea .................. 16114

[51] Int. Cl.⁵ ............................................ B29C 45/14
[52] U.S. Cl. ........................ 264/513; 156/152; 156/156; 273/167 H
[58] Field of Search .......... 273/167 H, 167 R, 167 A, 273/167 D; 264/512, 513, 516; 156/156, 152, 245; 164/464, 465

[56] References Cited

U.S. PATENT DOCUMENTS

| | | | |
|---|---|---|---|
| 4,314,964 | 2/1982 | Ferrary | 264/513 X |
| 4,575,447 | 3/1986 | Hariguchi | 273/167 H |
| 4,624,460 | 11/1986 | Murase et al. | 273/167 H |
| 4,811,949 | 3/1989 | Kobayashi | 273/167 H |

*Primary Examiner*—Geoffrey L. Knable
*Attorney, Agent, or Firm*—William W. Haefliger

[57] ABSTRACT

A method of making a hollow golf club head that includes forming a core that has a thin wall about a cavity; filling liquid into the core cavity; forming the club head body about the core by injection molding; and removing liquid from the core cavity.

4 Claims, 2 Drawing Sheets

METHOD OF FORMING GOLF WOOD CLUB HEAD

BACKGROUND OF THE INVENTION

This invention concerns improvements in the construction of golf club heads, and more particularly has to do with forming of a golf "wood" club head having a core extending about a cavity. A major object is to facilitate provision of a lighter, but larger, golf club head, as compared with conventional club heads.

In general, in a golf game, the player who makes the farthest shot at the first drive is apt to lead the game. Therefore, in order for a golfer to make a far shot, he desires to have a lighter, but larger, driver club head. However, the head of a conventional golf club is comparatively heavy, (and therefore must be smaller in size) because the core inside the head is filled with solid material. This increased weight also restricts enlargement of the size of the head to a certain extent.

In the past, efforts were made toward making the inside of the core a cavity, but these resulted in failures because the heads become deformed by injection heat when they come out from the injection molding machine. For this reason the core of the conventional club head remained filled with solid material.

On the other hand, attempts have also been made to reduce the weight of the club head by having the core made of foam plastic. But this also fails to overcome deformation caused by injection heat, since the injected hot liquid surges into empty holes of the foam plastic.

SUMMARY OF THE INVENTION

It is a major object of the invention to provide a novel method for forming a golf club head that overcomes the above problems and difficulties. Basically, the core is made with a cavity by blow molding the cavity, then filled with liquid. Injection of the club head body material about the liquid-filled cavity then involves no deformation. Following injection, the liquid is taken out from the inside of the core, as via a hollow projection from which the sole plate is detached and thereafter reattached. Thus, this manufacturing method ensures production of a comparatively lighter, but larger, club head.

These and other objects and advantages of the invention, as well as the details of an illustrative embodiment, will be more fully understood from the following specification and drawings, in which:

DRAWING DESCRIPTION

DETAILED DESCRIPTION

Figure 1:
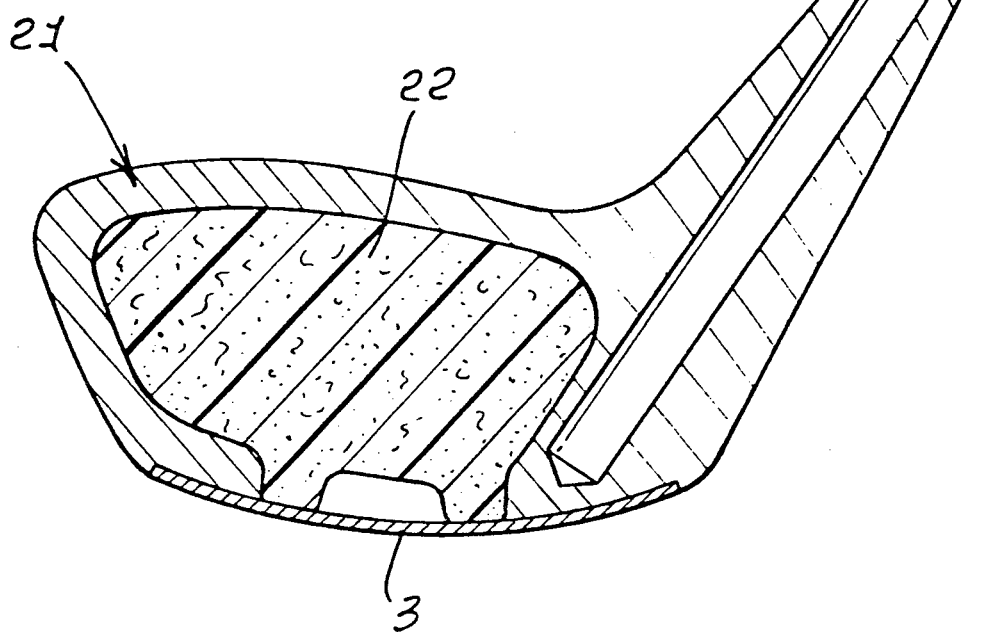
FIG. 1 is a cross section taken through a conventional golf club head.

In a known golf club head, as seen in FIG. 1, solid filler material 22 is received into a cavity in the head 21, above a sole plate 3. This has the disadvantages referred to above.

Figure 2:
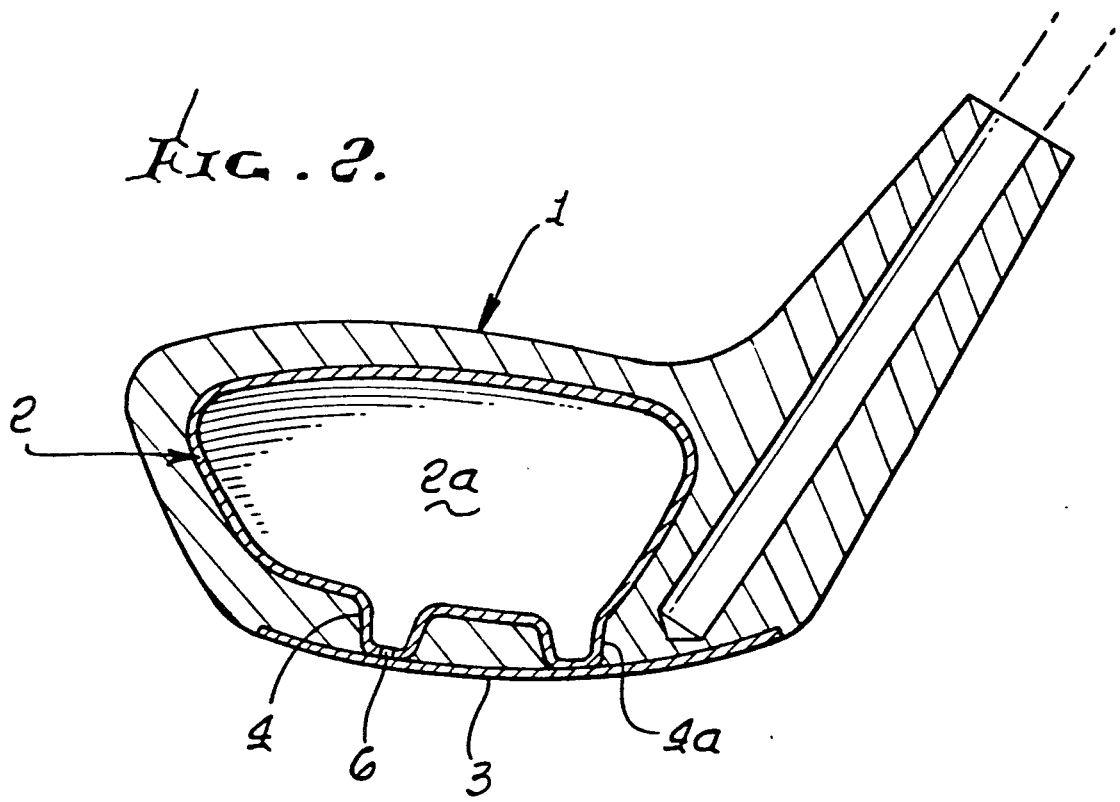
FIG. 2 is a cross section take through the golf club head of the present invention.

FIG. 2 shows the improved golf club head of the invention. It includes a thin-walled core 2 that is located within the head 1; and core 2 has outline shape generally the same or similar to the outline shape of the head 1. The core extends about, and forms, a hollow or cavity 2a, adapted to be liquid filled, and subsequently drained, as will be explained. The core also includes at least one, and preferably two, hollow, thin-walled projections or feet 4 that extend downwardly and away from the main extent of the core, as shown. A thin sole plate 3, conventionally metallic, is suitably attached to the bottom of the projections and also underlies substantial extent of the body 1. That body, normally metallic, is typically injection molded about the core, and against the sole plate, using conventional injection molding techniques. Note also the elongated opening in the body to receive a golf club shaft.

Figure 3:
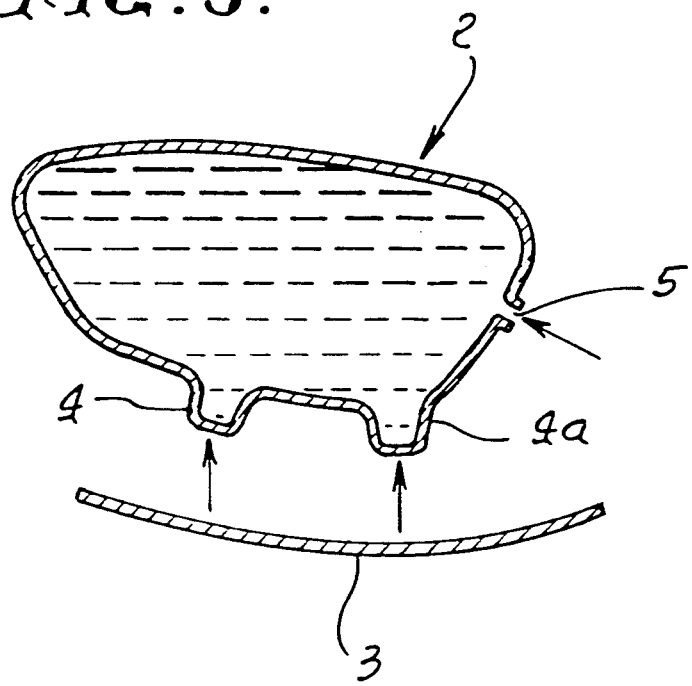
FIG. 3 is an exploded cross section showing a stage in the formation of the FIG. 2 head.
Figure 4:
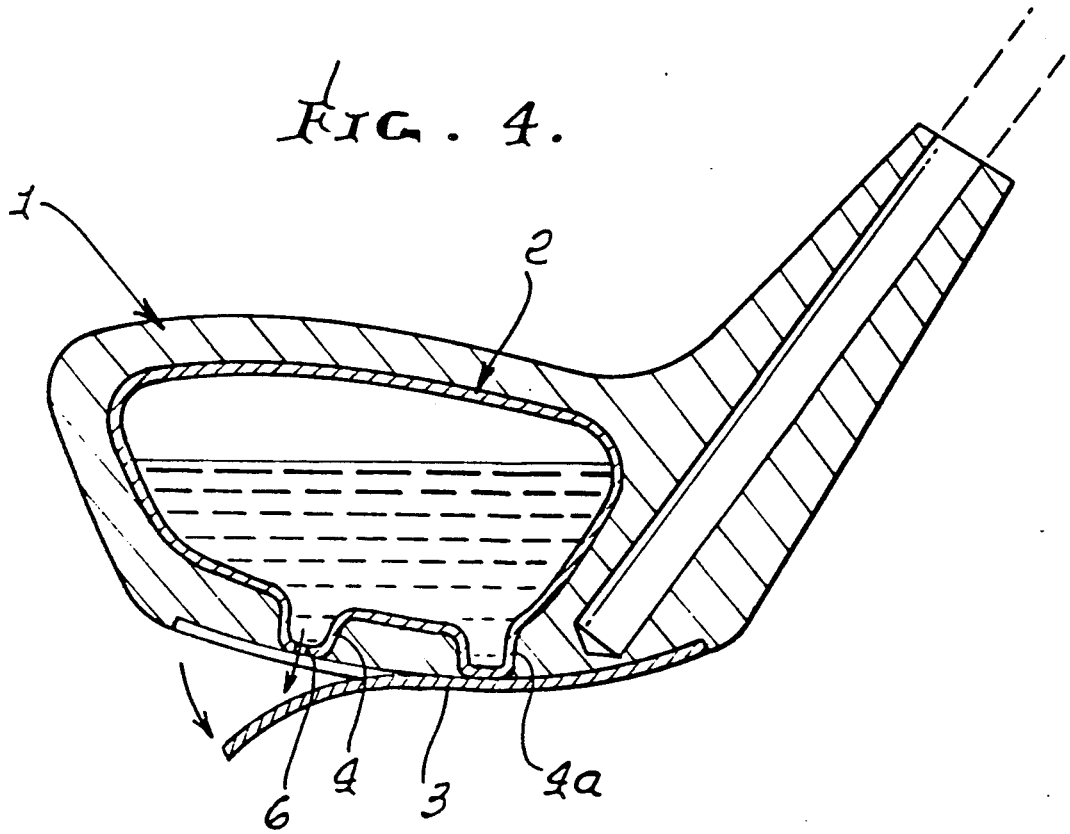
FIG. 4 is a view showing the club head of the invention during a later stage of its production.

During manufacture, and as seen in FIGS. 3 and 4, the core 2 and projections 4 are formed to the shape shown, as by a blow molding step. The inside of the core, i.e., the cavity, is then filled with a liquid through the blow molding air inlet 5. Following this, the air inlet is closed by heat application. The hollow core, filled with liquid, thus provides a compression resistant unit.

With the sole plate 3 attached to the projection 4 or projections of the liquid-filled core 2, forming of the head 1 is next accomplished by injection molding. Thus, it is made possible to produce a head freed of any deformation because the core 2 is not subject to compressive deformation due to the inside liquid, while the head is being formed by injection molding.

Following the completion of the injection molding step, the sole plate 3 is detached from the projection 4, and a hole 6 is bored through the projection bottom wall in order to drain the liquid inside the core 2. See FIG. 4. Finally, the sole pate 3 is again attached or reattached to the projection and to the body underside, as in FIG. 2.

Advantages are as follows:

First, when the core 2 is manufactured so as to have a cavity, by the blow molding method, and the cavity is filled with a suitable liquid, the core resists external pressure, resulting in production of the head 1 freed of an deformation of the core or its cavity.

Second, when the liquid inside the cavity is drained away from the hole of the projection 4, the cavity becomes empty, resulting in making the head lighter than it would be if filled. Accordingly, the invention achieves a combination of less weight, and/or enabled larger size for the same weight of a golf club head.

I claim:

1. The method of making a hollow golf club head that includes:
   a) forming a core that has a thin wall about a cavity, said forming of the core including forming of at least one hollow projection that extends outwardly from the main extent of the core, said projection having an end wall, said golf club head including a sole plate, and including the step of locally attaching said sole plate to the projection end wall,
   b) filling sufficient liquid into the core cavity, via a small opening through the core wall, to resist core deformation during subsequent injection molding and thereafter closing said opening,
   c) forming the club head body about the core by injection molding,
   d) locally detaching the sole plate from the projection end wall,
   e) removing said liquid from the core cavity, said removing of liquid being effected via the hollow projection, and thereafter reattaching the sole plate to the projection end wall.

2. The method of claim 1 wherein said core forming step is carried out by blow molding.

3. The method of claim 2 wherein said blow molding is effected by introducing air under pressure to the core cavity via a small opening in the cavity wall, and said liquid is introduced to said cavity via said small opening.

4. The method of claim 1 wherein two of said projections are thus formed, and said sole plate is attached to outermost extents of the hollow projections.

* * * * *